US009821846B2

(12) United States Patent
Schoepe et al.

(10) Patent No.: US 9,821,846 B2
(45) Date of Patent: Nov. 21, 2017

(54) DEVICE WITH A TORQUE SENSOR DEVICE AND A STEERING ANGLE SENSOR DEVICE FOR A MOTOR VEHICLE, MOTOR VEHICLE AND METHOD FOR OPERATING THE DEVICE

(71) Applicant: VALEO Schalter und Sensoren GmbH, Bietigheim-Bissingen (DE)

(72) Inventors: Roman Schoepe, Maulbronn (DE); Jens Thom, Böblingen (DE); Ekkehart Froehlich, Nordheim (DE); Dirk Rachui, Bietigheim-Bissingen (DE); Katalin Hadobas-Roessel, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 97 days.

(21) Appl. No.: 14/649,413

(22) PCT Filed: Dec. 13, 2013

(86) PCT No.: PCT/EP2013/076483
§ 371 (c)(1),
(2) Date: Jun. 3, 2015

(87) PCT Pub. No.: WO2014/090977
PCT Pub. Date: Jun. 19, 2014

(65) Prior Publication Data
US 2016/0214648 A1 Jul. 28, 2016

(30) Foreign Application Priority Data

Dec. 13, 2012 (DE) .................. 10 2012 024 383

(51) Int. Cl.
*G01L 3/02* (2006.01)
*B62D 15/02* (2006.01)
(Continued)

(52) U.S. Cl.
CPC .......... *B62D 15/0215* (2013.01); *B62D 6/10* (2013.01); *G01D 5/14* (2013.01); *G01D 5/145* (2013.01); *G01L 3/104* (2013.01); *G01L 5/221* (2013.01)

(58) Field of Classification Search
CPC ........ B62D 6/10; B62D 15/0215; G01D 5/14; G01D 5/145; G01L 5/221; G01L 3/104; G01B 7/30
(Continued)

(56) References Cited

U.S. PATENT DOCUMENTS

| 2004/0194560 | A1 | 10/2004 | Froehlich et al. | |
|---|---|---|---|---|
| 2007/0157740 | A1* | 7/2007 | Jerems et al. | G01L 5/221 73/862.328 |
| 2010/0194385 | A1* | 8/2010 | Ronnat et al. | B62D 15/0245 324/207.25 |

FOREIGN PATENT DOCUMENTS

| DE | 195 06 938 A1 | 8/1996 |
|---|---|---|
| DE | 199 62 241 A1 | 7/2001 |

(Continued)

OTHER PUBLICATIONS

International Search Report issued in corresponding PCT Application No. PCT/EP2013/076483 mailed May 9, 2014 (6 pages).
(Continued)

*Primary Examiner* — Lisa Caputo
*Assistant Examiner* — Roger Hernandez-Prewitt
(74) *Attorney, Agent, or Firm* — Osha Liang LLP

(57) ABSTRACT

A device for a motor vehicle having a torque sensor device for detecting a torque applied to a steering shaft of the motor vehicle and with a steering angle sensor device for detecting a current steering angle of the steering shaft is disclosed. The torque sensor device has a magnetic stator designed to conduct magnetic flux from a magnet to at least one flux conductor and through the same to at least one magnetic
(Continued)

sensor of the torque sensor device, and two stator parts that are disposed so as to be displaced in the axial direction relative to each other, each of which comprises an annular edge element extending in the radial direction. The steering angle sensor device includes at least one rotation transmission element with a permanent magnet and a magnetic field detector for detecting a rotary motion of the rotation transmission element.

16 Claims, 12 Drawing Sheets

(51) Int. Cl.
  *G01L 5/22* (2006.01)
  *G01L 3/10* (2006.01)
  *B62D 6/10* (2006.01)
  *G01D 5/14* (2006.01)

(58) Field of Classification Search
  USPC .................. 73/862.193, 862.326, 862.328
  See application file for complete search history.

(56) References Cited

FOREIGN PATENT DOCUMENTS

| | | |
|---|---|---|
| DE | 102 40 049 A1 | 4/2003 |
| DE | 10 2007 043 502 A1 | 4/2009 |
| DE | 10 2008 011 448 A1 | 9/2009 |
| DE | 10 2010 033 769 A1 | 2/2012 |
| FR | 2 919 385 A1 | 1/2009 |
| WO | 2012/025683 A1 | 3/2012 |

OTHER PUBLICATIONS

Angleviel, Didier et al.; "Development of a Contactless Hall effect torque sensor for Electric Power Steering", 2006-01-0939; SAE 2006 World Congress & Exhibition; Apr. 3, 2006 (8 pages).

* cited by examiner

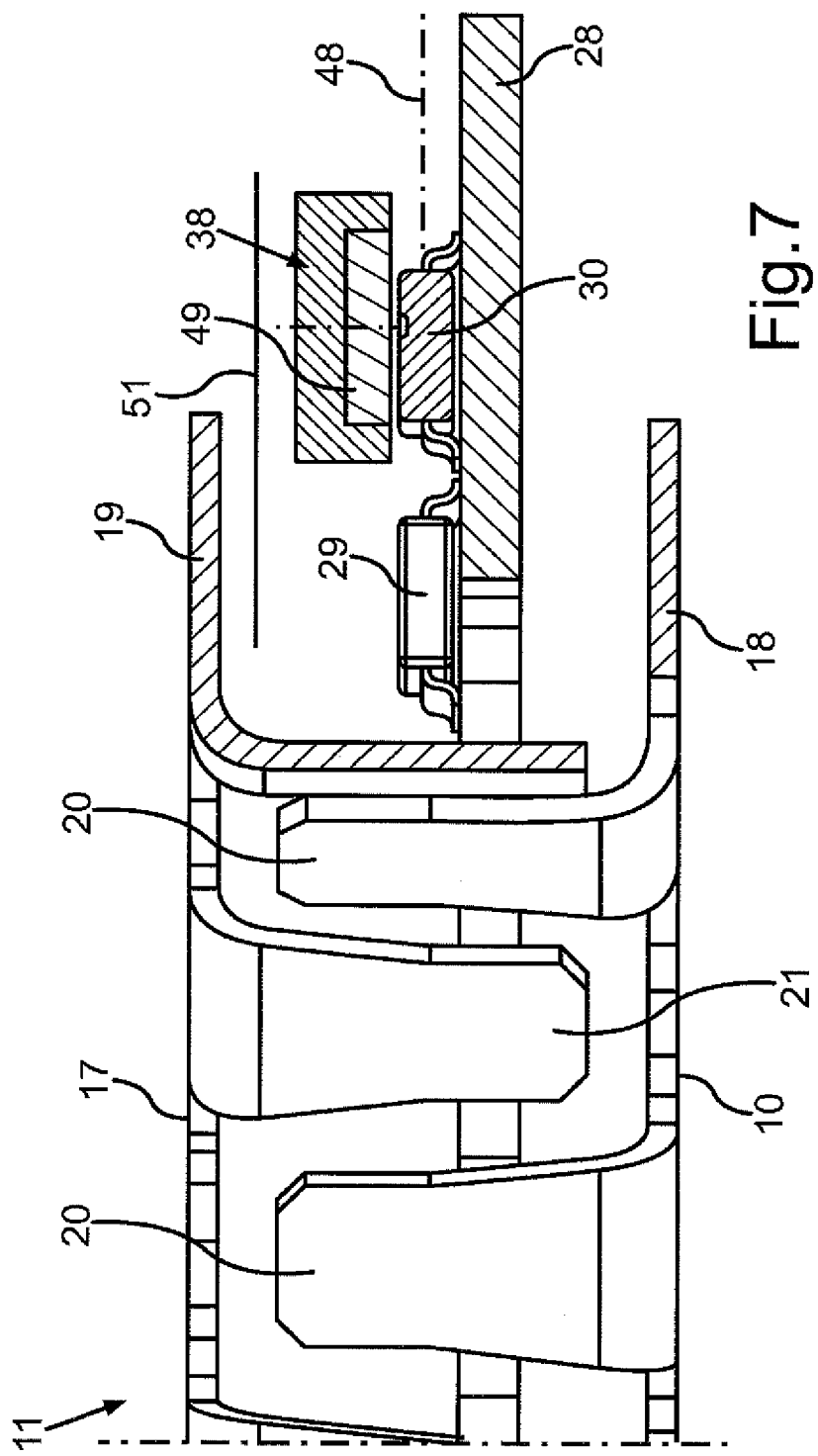

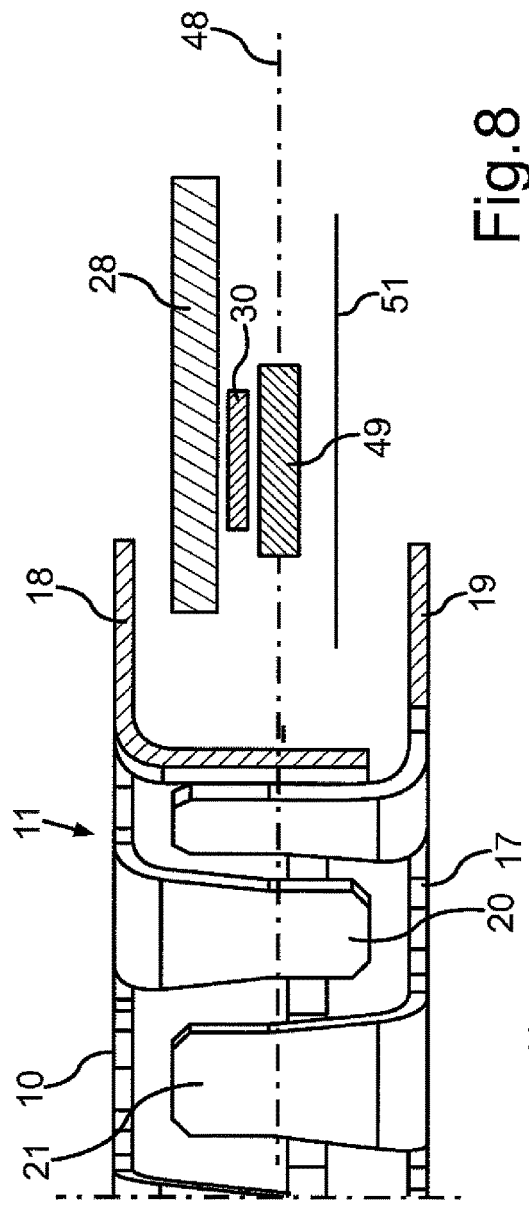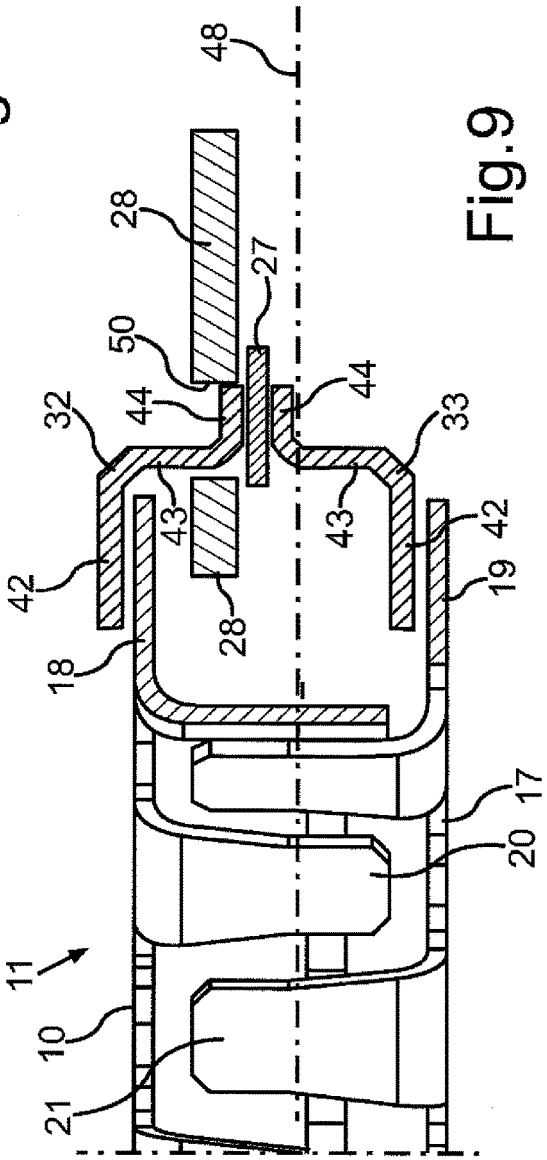

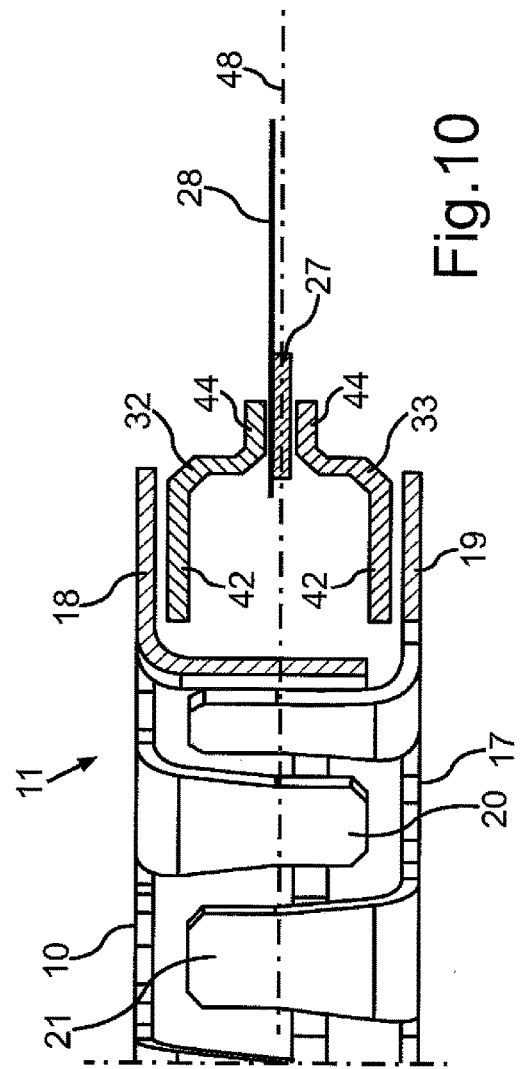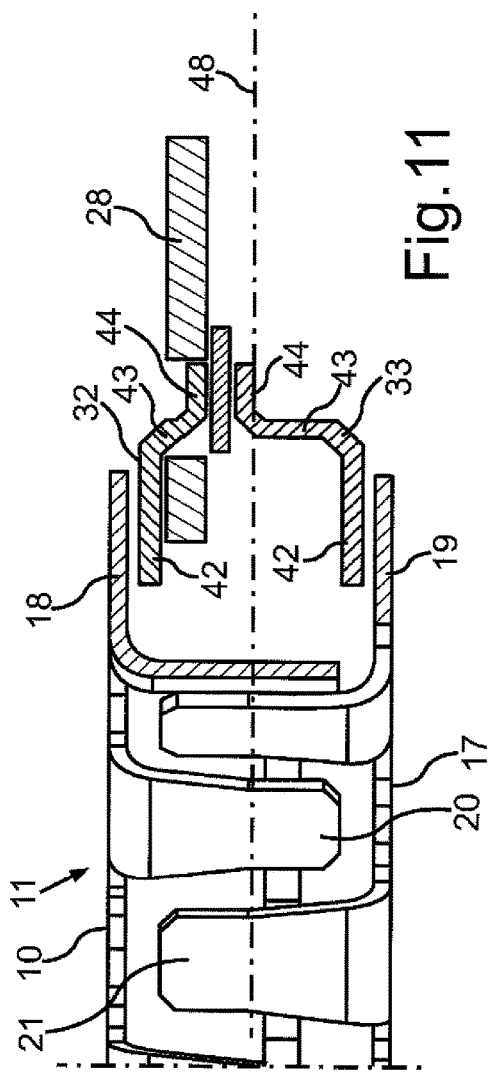

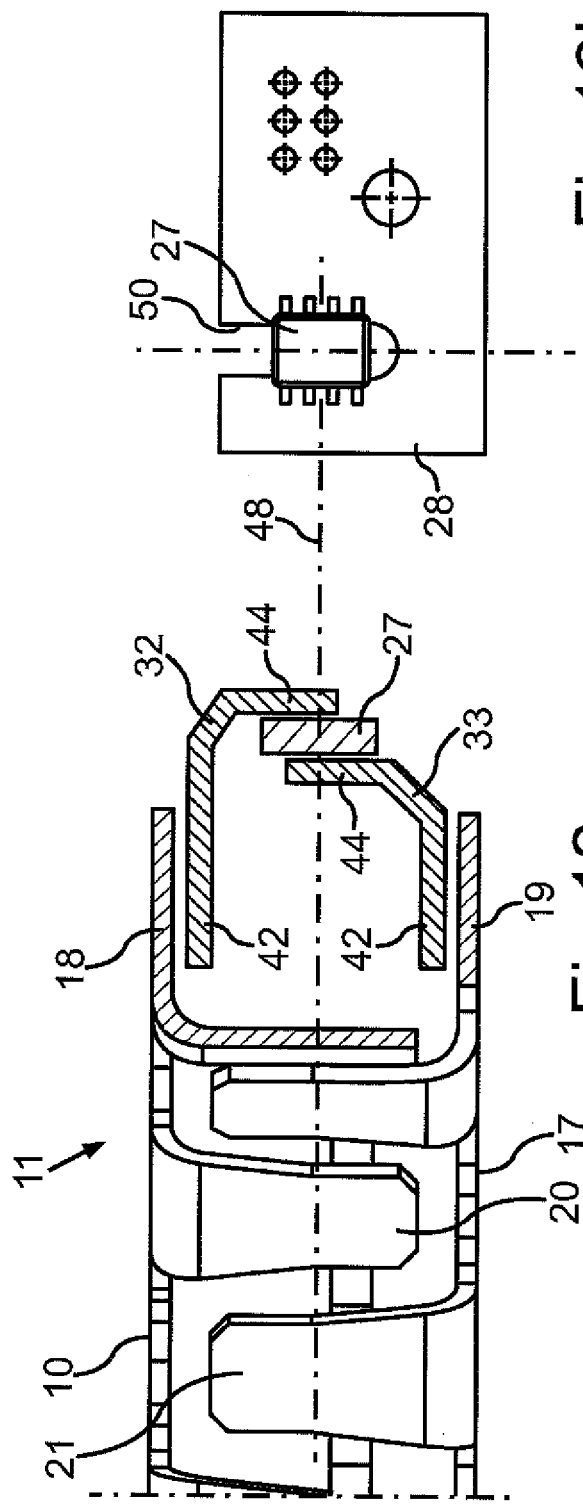

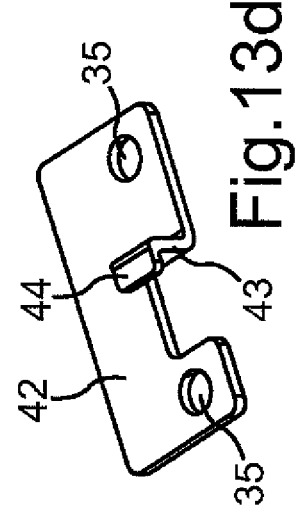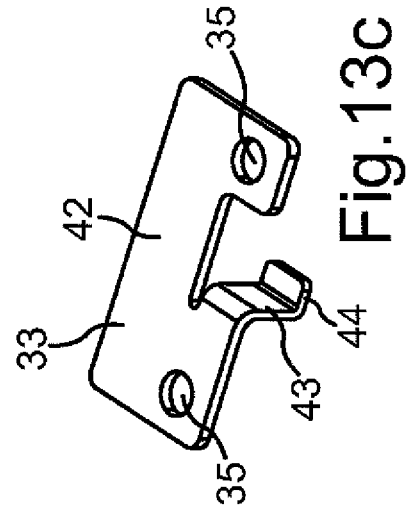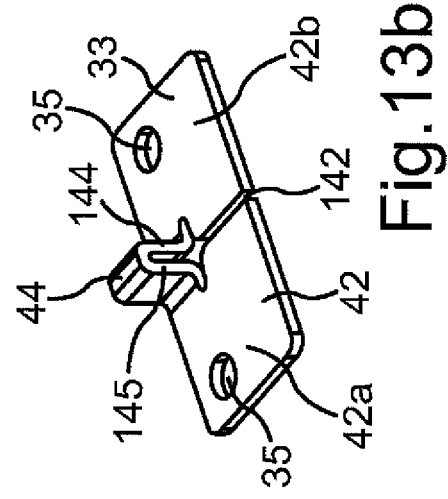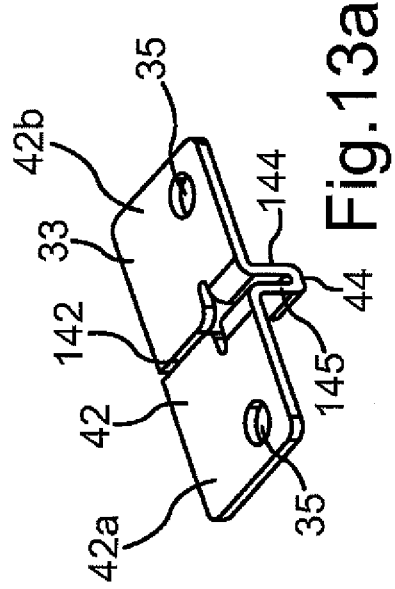

DEVICE WITH A TORQUE SENSOR DEVICE AND A STEERING ANGLE SENSOR DEVICE FOR A MOTOR VEHICLE, MOTOR VEHICLE AND METHOD FOR OPERATING THE DEVICE

The invention relates to a device for a motor vehicle, with a torque sensor device for detecting a torque applied to a steering shaft of the motor vehicle, and with a steering angle sensor device for detecting a current steering angle of the steering shaft. The torque sensor device comprises a magnetic stator that is designed to conduct magnetic flux from a magnet to at least one flux conductor and through the same to at least one magnetic sensor and two stator parts disposed so as to be displaced relative to each other in the axial direction, each comprising an annular edge element extending in the radial direction. By contrast, the steering angle sensor device comprises at least one rotation transmission element (for example a gear wheel) with a permanent magnet and a magnetic field detector for detecting a rotary motion of the rotation transmission element.

Torque sensor devices for detecting a torque applied to a steering shaft of a motor vehicle are already prior art. Such torque sensor devices can for example be used with electrical steering systems. A torque sensor device is for example known from document US 2004/0194560 A1 as well as from document DE 102 40 049 A1. The torque sensor device is in this case attached to two shaft segments or part shafts of the steering shaft that are mutually opposite in the axial direction and that are joined to each other by means of a torsion rod. A magnet—for example a ring magnet—is disposed on the first shaft segment, whereas a holder with a magnetic stator is attached to the other shaft segment, being opposed to the permanent magnet in the radial direction across a small air gap. By means of the stator—which usually consists of two separate stator parts—the magnetic flux of the magnet is passed to a first and a second flux conductor, which then pass the magnetic flux to a magnetic sensor—for example a Hall sensor. In this case the magnetic sensor is disposed between the two flux conductors, as can clearly be seen for example in FIGS. 7 and 8 of the document US 2004/0194560 A1.

Such a torque sensor device is also known from document DE 10 2007 043 502 A1.

Moreover, steering angle sensor devices that are used for detecting the current steering angle of the steering shaft are also known from the prior art. Such a device can for example be seen to be known from the document DE 10 2008 011 448 A1. A rotary motion of the steering shaft is transferred here by means of a transmission to a smaller gear wheel that carries a magnet. The rotation of the smaller gear wheel is then detected using a magnetic sensor.

Interest is primarily directed towards devices in which the torque sensor device on the one hand as well as the steering angle sensor device on the other hand are integrally formed as a common assembly. Such a device with a torque sensor and a rotation angle sensor is for example known from the document DE 10 2010 033 769 A1.

With the combined devices, such as are known from the prior art, there is a great challenge to minimize the overall height or the extent of the device in the axial direction. In particular, in this case the gear wheels (torque transfer elements) of the steering angle sensing means take up a relatively large installation space in the axial direction.

It is the object of the invention to reveal a solution as to how the axial installation height can be reduced in comparison to the prior art for a device of the above-mentioned type.

This object is achieved according to the invention by a device, by a motor vehicle as well as by a method with the features according to the respective independent claims. Advantageous embodiments of the invention are the subject matter of the dependent claims, the description and the figures.

A device according to the invention for a motor vehicle comprises a torque sensor device that is designed to detect a torque applied to a steering shaft of the motor vehicle, as well as a steering angle sensor device that is designed to detect the current steering angle of the steering shaft. The torque sensor device comprises a magnetic stator that is designed to conduct magnetic flux from a magnet to at least one flux conductor and through the same to at least one magnetic sensor. The stator comprises two stator parts disposed so as to be displaced relative to each other in the axial direction, each comprising an annular edge element extending in the radial direction. The steering angle sensor device comprises at least one rotation transmission element (for example a gear wheel) with a permanent magnet and a magnetic field detector for detecting a rotary motion of the rotation transmission element. A rotary motion of the steering shaft can be transferred to the rotation transmission element. The at least one rotation transmission element with the permanent magnet are disposed between the edge elements in the axial direction.

According to the invention, it is thus proposed to dispose the essential component of the steering angle sensor device, namely the at least one rotation transmission element with its permanent magnet, not axially outside the stator, but between the two stator parts or between the respective edge elements in the axial direction. With a constant axial distance between the stator parts, the axial installation height or the axial extent of the entire device is thereby reduced compared to the prior art or compared to embodiments in which the rotation transmission element with its permanent magnet is disposed so as to be axially displaced relative to the stator. Thus overall a device is provided that is very compact in the axial direction and that is integrated in a space-saving manner, which is designed both to detect the torque and also to detect the steering angle.

The at least one rotation transmission element preferably has a mutually working connection to a rotor that is connected to one of the shaft segments. By means of the rotor, the rotary motion of the steering shaft can be transferred to the smaller diameter rotation transmission element, and the rotary motion of the rotation transmission element can be detected by the magnetic field detector and the steering angle can be determined therefrom. The at least one rotation transmission element is preferably in the form of a gear wheel with a peripheral tooth structure that engages a rotor that is rotationally fixedly joined to the steering shaft and that comprises a peripheral tooth structure. The rotor can be disposed on a holder to which the magnetic stator is also attached.

Said magnet, from which the magnetic flux is conducted by means of the stator to the flux conductor and through the same to the magnetic sensor, can for example be connected to a first shaft segment of the steering shaft. The magnetic stator can by contrast be disposed on said holder and can be rotationally fixedly connected to said holder, which can be connected to a second shaft segment of the steering shaft. The two shaft segments can in particular be coupled together by means of a torsion rod. Optionally, a sliding piece can be used for the holder, being designed to carry the at least one flux conductor, wherein the holder with the stator is disposed rotatably relative to the sliding piece and hence relative to the flux conductor.

In one embodiment, it is provided that the at least one rotation transmission element with its permanent magnet is disposed to be at least partially in mutual axial overlap with the edge elements of the stator parts. This means that there is a projection of the rotation transmission element in the axial direction onto the two edge elements. By such an arrangement of the at least one rotation transmission element, the extent of the device is also reduced in the radial direction.

In addition or alternatively, at least one rotation transmission element with its associated permanent magnet can be disposed so as to be displaced in the radial direction relative to the edge elements. This in turn means that there is no axial projection of the rotation transmission element onto the two edge elements of the stator parts. Said embodiment has the advantage that crosstalk between the permanent magnet and the magnetic sensor of the torque sensor device by means of the magnetic stator can be prevented. Errors in the detection of the torque are thus also prevented.

The axial installation height is further reduced if the magnetic field detector is disposed on a circuit board that is disposed axially between the two edge elements or axially between the stator parts and in particular also parallel to the edge elements.

The two stator parts thus each comprises an annular edge element extending in the radial direction or directed radially outwards and in particular being flanged as well as forming an axial edge of the respective stator part. Said edge elements are thus perpendicular to the axis of rotation of the steering shaft or the device and parallel to each other. A plurality of tooth elements that are disposed distributively in the peripheral direction can each protrude in the axial direction from the respective edge elements. The tooth elements of the one stator part are disposed distributively in the peripheral direction alternately with the tooth elements of the other stator part, so that the tooth elements of the one stator part extend axially into respective gaps between the tooth elements of the other stator part. In this case the flanged edge elements preferably overlap each other in the axial direction, and the respective tooth elements preferably point axially in opposite directions. The annular edge elements are used in this case to transfer the magnetic flux to the respective flux conductor. A plate-shaped receiving region of the flux conductor is preferably disposed for this purpose at a very short distance from the flanged edge element of the respective stator part. By contrast, the tooth elements are used to receive the magnetic flux from the magnet that is attached to one of the shaft segments.

In one embodiment, the permanent magnet of the rotation transmission element is disposed off-centre in the axial direction between the two edge elements. Preferably, in this case the at least one magnetic sensor of the torque sensor device is disposed axially centrally between the two stator parts or the respective edge elements. This means that the at least one magnetic sensor lies at the same axial distance from the two edge elements. In this embodiment the permanent magnet of the rotation transmission element is preferably designed or surface magnetized such that it provides a magnetic field with equal field strength at the respective edge elements of the stator parts. The magnetic field is thus of equal magnitude at the respective axial height of the two edge elements, so that said magnetic fields of the permanent magnet at the edge elements on both sides cancel each other out. Influencing of the magnetic flux that is conducted by means of the stator to the magnetic sensor is prevented in this way. Errors during the detection of the torque can thus be prevented.

According to an alternative embodiment, the magnet of the rotation transmission element can be disposed axially centrally between the two stator parts or the respective edge elements, so that the magnetic sensor of the torque sensor device and the magnetic field detector of the steering angle sensor device lie axially off-centre. With said embodiment, the two flux conductors are preferably disposed asymmetrically relative to a plane of symmetry or a central plane between the edge elements of the stator parts on both sides. The one flux conductor can lie fully axially within the stator and hence axially between the edge elements, whereas the other flux conductor can be disposed at least with its receiving region axially outside the stator or axially displaced relative thereto. Such an arrangement of the permanent magnet axially in the centre between the edge elements has the advantage that the field strength of the magnetic field at the two edge elements is also identical in the case of a "normal" permanent magnet without a special surface magnetization, so that no crosstalk occurs between the two types of sensor.

In general the two flux conductors can be identical components or they can even be of a different design.

Optionally, a screening means for magnetic fields can also be disposed axially between the permanent magnet of the rotation transmission element on the one hand and at least one of the edge elements on the other hand. Such a screening means can in particular be provided in the form of a screening plate that extends parallel to the circuit board. The screening means has the advantage that crosstalk between the two sensor parts by means of the stator can be effectively minimized. It may also be formed by metallization of the circuit board itself or may be a separate component from the circuit board.

As already mentioned, the steering angle sensor device preferably comprises a rotor with a tooth structure. The rotation transmission element can be in the form of a gear wheel that can be brought into engagement with the tooth structure of the rotor and by means of which a rotary motion of the rotor and hence of the steering shaft can be transferred into a rotary motion of the permanent magnet. Preferably, the rotor with its peripheral tooth structure is moulded directly onto said holder, on which the stator is disposed and which is connected to one of the shaft segments of the steering shaft. This eliminates an additional gear wheel as an independent part, as well as the associated process of joining the rotor to the holder. Moreover, there is improved concentricity of the tooth elements as a result of said one-piece embodiment of the rotor with the holder.

In one preferred embodiment, the at least one magnetic sensor of the torque sensor device is in the form of an SMD component (Surface Mounted Device), which is disposed on a circuit board, namely in particular a common circuit board for the torque sensor device and the steering angle device, on which the magnetic field detector of the steering angle sensor device is also mounted. In this case the at least one flux conductor preferably comprises a tab that is disposed in mutual overlap with the magnetic sensor. Whereas the magnetic sensor has to be in the form of a THT component (Through Hole Technology) in the prior art because of the configuration of the flux conductor, with this embodiment it is proposed to design the magnetic sensor as an SMD component and to configure the flux conductor such that it comprises a tab, in particular extending in the radial direction, which is disposed in mutual overlap with the magnetic sensor. As a result the mounting and soldering of wired components are eliminated with the associated disadvantages. All components can be mounted as SMD components on the circuit board in a common production step, so that overall the cost of production is significantly reduced in comparison to the prior art. Since SMD components can also be made particularly flat, the size of the device in a direction perpendicular to the circuit board, in particular in the axial direction, can be further reduced. In particular, there is a significant reduction of the axial installation height if the circuit board is disposed perpendicular to the axial direction or lies in a radial plane. Preferably, in doing so the circuit board is disposed axially between the two edge elements of the stator parts.

In order to further reduce the axial installation height, in one embodiment it is provided that the tab of the flux conductor is a tab pointing axially or radially or in the radial direction that is disposed in mutual axial overlap with the magnetic sensor.

The tab can thus be a radial tab that points in the radial direction. Alternatively, however, it can also be provided that the tab essentially points in the axial direction and hence is axially oriented without comprising a special radial segment. Here too there is a mutual overlap between the tab and the magnetic sensor, namely in particular in the axial direction or alternatively in the radial direction, depending on the orientation of the circuit board.

The at least one flux conductor preferably comprises a plate-shaped receiving region for receiving the magnetic flux from the stator, said receiving region being disposed in mutual axial overlap with the stator. The tab extending parallel to the receiving region can then be disposed so as to be displaced in the axial direction relative to the receiving region. This means that the radial tab of the flux conductor is connected to the receiving region by means of a web or a bridge element, wherein the web is disposed at an angle, in particular perpendicularly, both to the receiving region as well as to the tab. In this case the flux conductor is preferably of one piece in total, so that the receiving region on the one hand as well as the web and the radial tab on the other hand are formed in one piece with each other. As a result of the radial tab being disposed so as to be displaced in the axial direction relative to the receiving region of the flux conductor, on the one hand the receiving region can be at a very short distance from the stator and on the other hand the tab can be disposed at a very short distance from the magnetic sensor, so that reliable transfer of the magnetic flux from the stator to the magnetic sensor is guaranteed.

The at least one flux conductor can—similarly to the stator—be made of a magnetic material, for example soft magnetic material.

The torque sensor device can also comprise two flux conductors, each with at least one of said tabs, being disposed on mutually opposite sides of the circuit board. The respective tabs can be disposed in mutual, in particular axial, overlap with the magnetic sensor. The magnetic sensor is thus disposed effectively as a sandwich element between the tab of the one flux conductor on the one hand and the tab of the other flux conductor on the other hand and overlaps the two tabs, in particular in the axial direction. The transfer of the magnetic flux to the magnetic sensor by means of the two separate stator parts as well as by means of the respective flux conductors can thus be enabled, so that reliable detection of the torque is also guaranteed.

In order to a enable an effective flux transfer to the magnetic sensor from that flux conductor that is disposed on the rear side of the circuit board, the circuit board can comprise a cut-out formed below the magnetic sensor for the tab of the flux conductor. The cut-out is preferably a through hole in the circuit board. The tab of said flux conductor can extend into the cut-out of the circuit board, in particular axially. In this way the axial distance between the magnetic sensor or its rear side on the one hand and the tab of the flux conductor on the other hand can be minimized and the transfer effect can be optimized. Moreover, the axial installation height also reduces even more as a result.

Alternatively to the cut-out, the circuit board can also be made in the form of a thin film as a so-called flex circuit board. The same then preferably has a thickness of less than 0.2 mm, so that the magnetic flux can be transferred through said film without a through opening having to be specially provided. An effective flux transfer to the magnetic sensor can be enabled from the flux conductor that is disposed on the rear side of the circuit board.

The magnetic flux can thus be tapped with a total of two flux conductors at the respective edge elements of the stator and conducted by means of the respective narrow tabs to the magnetic sensor and concentrated there. The tabs preferably reach in this case as far as close to the top and bottom of the magnetic sensor in order to obtain a very narrow air gap. For this purpose, said cut-out, which is preferably designed as a through opening in the circuit board, can be provided in the circuit board below the magnetic sensor.

The torque sensor device can also comprise two magnetic sensors in the form of SMD components, each for detecting the magnetic flux, and the at least one flux conductor can comprise two preferably radial tabs, in particular being disposed in a common radial plane and each being disposed in mutual, in particular axial, overlap with one of the magnetic sensors. By providing two separate magnetic sensors as well as two tabs for conducting the magnetic flux to the respective magnetic sensors, redundant detection of the magnetic flux and thus redundant determination of the torque on the steering shaft are enabled, so that errors in the determination of the torque can be excluded because of the specified redundancy.

At least one magnetic sensor of the torque sensor device can be in the form of a dual sensor with two integrated sensor elements that are integrated within the SMD component and that can detect the magnetic flux separately. With such a dual magnetic sensor, an additional redundancy in relation to detecting the torque can be enabled and/or the torque sensor device can manage with only a single magnetic sensor containing two integrated sensor elements.

If in total two separate magnetic sensors are provided as separate SMD components, then at least one of said magnetic sensors can be in the form of a dual sensor with two sensor elements. Optionally, even both magnetic sensors can be in the form of dual sensors.

If the torque sensor device only comprises one magnetic sensor, the same can be in the form of a dual sensor with two sensor elements for separately detecting the magnetic flux.

The number of magnetic sensors used preferably corresponds to the number of tabs that are used with a single flux conductor. A respective tab of the at least one flux conductor is thus associated with each magnetic sensor.

Moreover, the invention relates to a motor vehicle with a device according to the invention.

A method according to the invention is used to manufacture a device according to the invention.

The preferred embodiments presented with reference to the device according to the invention and their advantages apply correspondingly to the motor vehicle according to the invention as well as to the method according to the invention.

Further features of the invention arise from the claims, the figures and the description of the figures. All features and combinations of features mentioned above in the description as well as the features and combinations of features mentioned below in the description of the figures and/or shown in the figures alone are not only able to be used in each specified combination, but also in other combinations or even on their own.

The invention is explained in detail below using a preferred exemplary embodiment, as well as with reference to the accompanying figures.

In the figures:

FIG. 7 shows a first axial arrangement of electronic components of the device in a schematic and partly sectional illustration; and FIGS. 8 and 9 show a second axial arrangement of electronic components of the device in a schematic and partly sectional illustration, wherein sectional views of a circuit board are shown along two different sectional planes;

FIG. 10 shows a further arrangement of electronic components of the device in a schematic and partly sectional illustration, wherein a flex circuit board is used as a circuit board;

FIG. 11 shows a further arrangement of electronic components of the device in a schematic and partly sectional illustration, wherein different flux conductors are used;

FIG. 12 shows a further arrangement of electronic components of the device in a schematic and partly sectional illustration, wherein the circuit board extends parallel to the axial direction; and FIG. 13 shows exemplary flux conductors in a schematic illustration.

Figure 1:
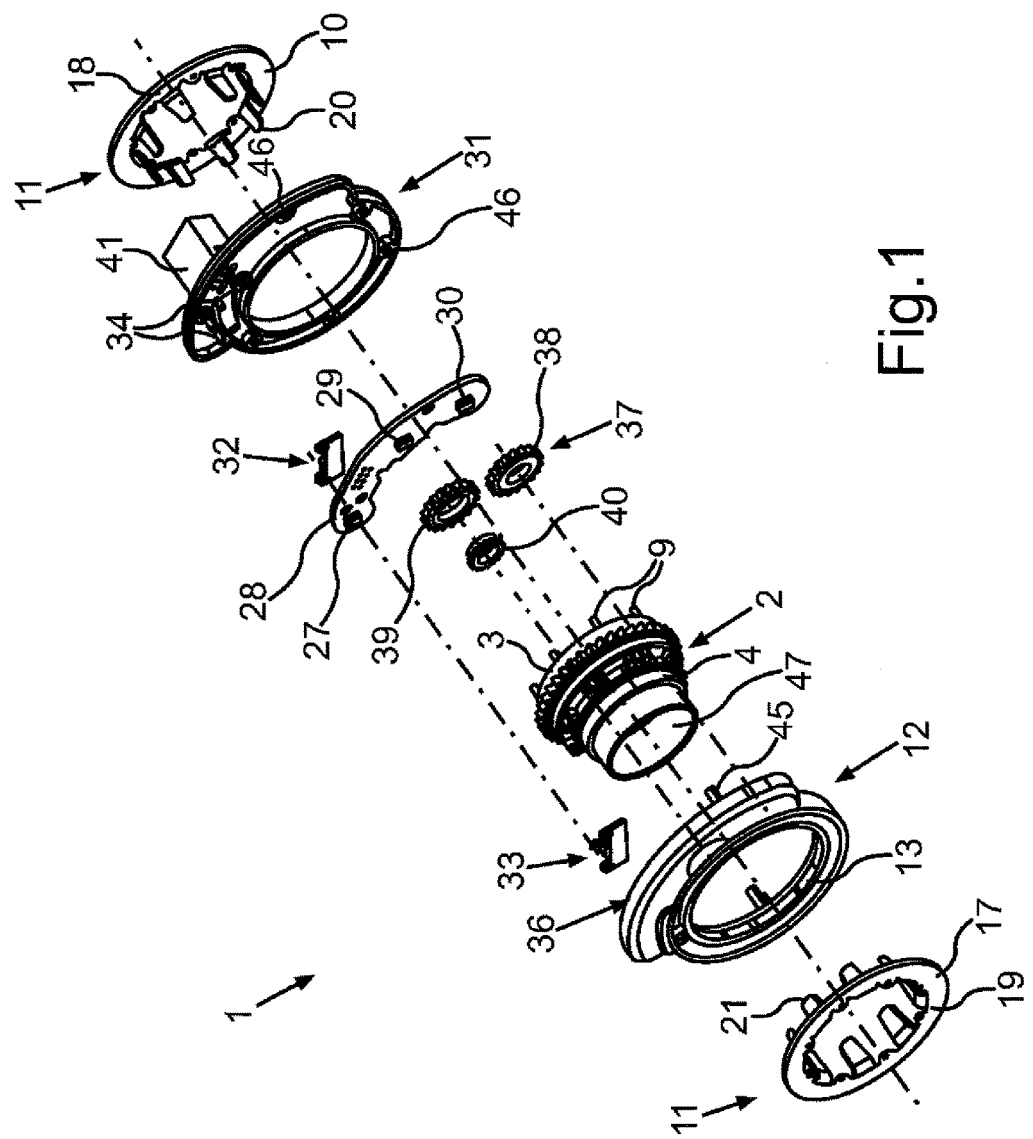
FIG. 1 shows an integrated device for a motor vehicle with a torque sensor device and a steering angle sensor device in a schematic exploded illustration.

A device according to an embodiment of the invention that is illustrated in FIG. 1 and that is generally designated with 1 comprises both a torque sensor device and also a steering angle sensor device. The torque sensor device is used for measurement of a torque applied to a steering shaft of a motor vehicle. The steering angle sensor device is used for detecting the current steering angle of the steering shaft. The device 1 is in the form of an integral unit, so that an integral sensor device is provided that is designed both to detect the torque as well as to measure the steering angle.

The steering shaft of the vehicle contains two shaft segments that are joined to each other by means of a torsion rod that is not illustrated in the figure. A holder 2 is rotationally fixedly attached to one of the shaft segments, whereas a magnet that is not illustrated in the figure—namely a permanent magnet, for example in the form of a ring magnet—is rotationally fixedly mounted on the other shaft segment. The holder 2 can be in the form of a one-piece plastic part of and/or a cast component. Optionally, the holder 2 can also be provided with a sleeve 47, for example of metal, or even other attachment elements such as tabs, hooks, clips and similar, in order to attach the holder 2 to the associated shaft segment.

The components of the torque sensor device are essentially: said permanent magnet, a magnetic stator 11 with two identical stator parts 10, 17, two flux conductors 32, 33 as well as a magnetic sensor 27 that is located on a circuit board 28. The steering angle sensor device contains by contrast: two magnetic field detectors or magnetic sensors 29, 30, a transmission 37 with rotation transfer elements, which are in the form of gear wheels 38, 39, 40, as well as a rotor 15 that is moulded onto the holder 2.

Figure 2:
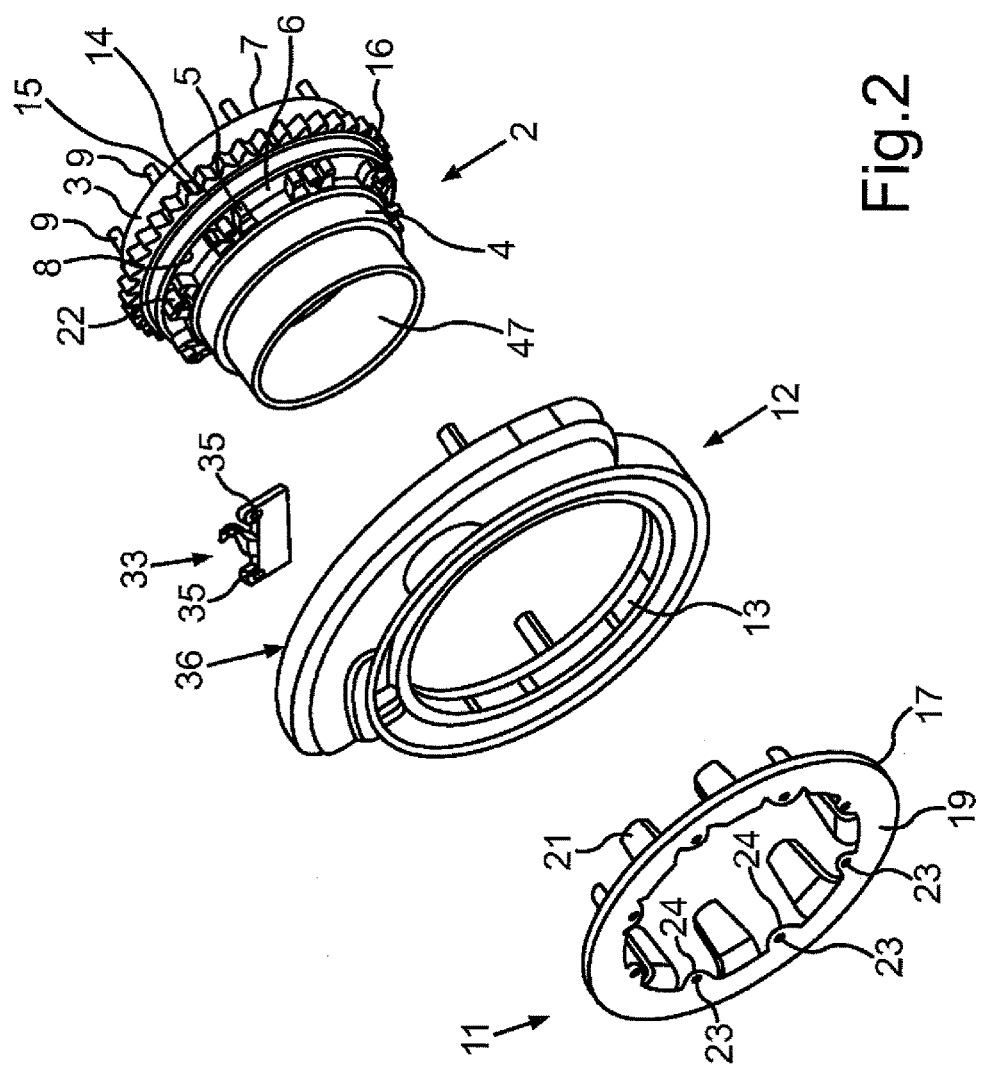
FIG. 2 shows a region of the device according to FIG. 1 in an enlarged illustration.

The holder 2 comprises, as is apparent in particular from FIG. 2, two axially adjacently disposed cylindrical regions, namely on the one hand a first cylindrical axial region 3 as well as a second axial region 4 that is disposed so as to be displaced in the axial direction as well to be concentric to the first region 3 and that has a somewhat smaller diameter. The first axial region 3 is connected to the second axial region 4 by means of a plurality of strut-like or spoke-shaped connecting elements 5 that are disposed so as to be distributed in the peripheral direction. Radial cut-outs 6 in the form of through openings are formed between the connecting elements 5.

The first axial region 3 has two axial peripheral edges, namely on the one hand a first outer peripheral edge 7 as well as on the other hand a second axial peripheral edge 8 facing the second axial region 4.

A plurality of axial pins or bolts 9 are formed on the first axial peripheral edge 7 that protrude from the edge 7 parallel to each other in the axial direction as axial protrusions. The holder 2 is connected by means of said pins 9 to a first stator part 10 of the stator, which is designated as a whole with 11.

Moreover, the device 1 contains a housing 12, which additionally has the function of a sliding piece. The housing 12 has an inner sleeve 13, which is of annular peripheral form and in which the first axial region 3 of the holder 2 is accommodated, so that the outer periphery of the first region 3 of the holder 2 can slide on an inner periphery of the sleeve 13. In this case the first axial region 3 of the holder 2 is inserted into the sleeve 13 as far as a flange 14 of the holder 2 that is formed by a rotor 15 with a tooth structure 16. The rotor 15 with the tooth structure 16 is moulded onto the first axial region 3 in this case.

Besides the first stator part 10, the stator 11 additionally comprises a second stator part 17. Each stator part 10, 17 is made in one piece and comprises an annular, flange-like edge element 18 or 19 extending outwards in the radial direction, as well as a plurality of tooth elements 20 or 21. The tooth elements 20, 21 protrude from the respective edge element 18, 19 in the axial direction, and indeed towards the first axial region 3 of the holder 2. The tooth elements 20, 21 thus extend in the axial direction approximately parallel to an axis of rotation of the steering shaft. The two stator parts 10, 17 are in this case of the same form, so that the number of tooth elements 20 of the first stator part 10 is the same as the number of tooth elements 21 of the second stator part 17.

For attaching the stator 11 to the holder 2, on the one hand the stator part 17 is fitted onto the second axial region 4 of the holder 2 so that the tooth elements 21 are axially fitted through the cut-outs 6 between the connecting elements 5 and are supported on an inner periphery of the first axial region 3 of the holder 2. After the fitting of the stator part 17 onto the second region 4 of the holder 2, the tooth elements 21 are disposed in the interior of the first axial region 3 of the holder 2, so that only the edge element 19 protrudes radially outwards and is axially supported on the axial peripheral edge 8 of the first axial region 3 of the holder 2.

When fitting the stator part 17 onto the second axial region 4 of the holder 2, pins 22 of the first axial region 3 formed on the connecting elements 5 in the region of the peripheral edge 8 are accommodated in corresponding through openings 23 and are inserted through said through openings 23, which are formed in the edge element 19 of the stator part 17. Said through openings 23 are formed in respective tabs 24, which protrude radially inwards in the direction towards the centre of the stator 11 or point towards the centre. In this case each such tab 24 with a through opening 23 is provided between each two adjacent tooth elements 21.

Following the fitting of the stator part 17 onto the second axial region 4 of the holder 2 and thus following accommodation of the pins 22 in the through openings 23, the free ends of the pins 22 can be reshaped and thus processed to form rivet heads in order to ensure secure seating of the stator part 17 on the holder 2.

The other stator part 10 is attached to the holder 2 such that the tooth elements 20 are inserted into the interior of the first axial region 3 of the holder 2 from the axial end of the holder 2 opposite the stator part 17 or from the side of the peripheral edge 7. During this the tooth elements 20 slide on the inner periphery of the cylindrical region 3. In the assembled state the tooth elements 20 are each disposed between two adjacent tooth elements 21 of the other stator part 17 and are in contact with the inner periphery of the region 3. The stator part 10 also comprises a plurality of tabs 25, in each of which a through opening 26 is formed. The corresponding pins 9 that are formed on the peripheral edge 7 of the holder 2 are inserted through said through openings 26. The free ends of said pins 9 are reshaped to form rivet heads and a secure attachment of the stator part to the holder 2 is thus guaranteed.

In principle, the two stator parts 10, 17 can be fixed on the holder 2 in various ways. The combination of pins 9 or 22 and through openings 26 or 23 constitutes only an exemplary embodiment. It is for example also possible to fix the stator parts 10, 17 to the holder 2 by means of retaining rings that are fixed to the holder by laser welding or even ultrasonic welding 2.

The torque sensor device comprises a magnetic sensor 27 that is disposed on a circuit board 28. The magnetic sensor 27 is in the form of an electronic SMD component, which is soldered directly to the circuit board 28 by means of solderable connecting surfaces. The appropriate technology is referred to as "surface mounting" (Surface Mounting Technology). The circuit board 28 is a common circuit board both for the magnetic sensor 27 of the torque sensor device and also for components of the steering angle sensor device. That is to say magnetic field detectors or sensor elements 29, 30 of the steering angle sensor device, which are also in the form of SMD components, are also disposed on the circuit board 28.

The device 1 comprises a cover 31 for closure of the housing 12.

Moreover, in the exemplary embodiment the device 1 comprises two flux conductors 32, 33, which are part of the torque sensor device. The two flux conductors 32, 33 are attached to the cover 31 on the one hand and to the housing 12 on the other hand. The cover 31 comprises two pins 34 for this purpose that are inserted through corresponding through openings 35 in the flux conductor 32. Corresponding pins are also provided on the side of the housing 12 for the second flux conductor 33. By reshaping the pins 34 rivet heads can be formed that ensure an effective and reliable fixing of the flux conductors 32, 33 to the cover 31 or the housing 12.

The housing 12 comprises an accommodation means 36 in which both the circuit board 28 with the components 27, 29, 30 and also a gear wheel transmission 37 of the steering angle sensor device can be accommodated. The gear wheel transmission 37 has two gear wheels 38, 39, whose teeth engage in those of the rotor 15 and in this way are rotatably coupled to the rotor 15 or the holder 2. A permanent magnet is disposed in the gear wheel 38. In this case the axis of rotation of the gear wheel 38 is parallel to the axis of rotation of the steering shaft. A second partial sensor system of the steering angle sensor device comprises the gear wheel 39, which is rotatably coupled as an intermediate gear wheel to a drive gear wheel or pinion 40. The drive gear wheel 40 also contains a permanent magnet. The gear wheels 38, 39, 40 are mounted in the accommodation means 36 of the housing 12 and are rotatably supported therein. There is an inner toothing in the accommodation means 36, on which the drive gear wheel 40 can roll along a cycloid. The bore of the gear wheel 39 is of an eccentric form for this purpose. The circuit board 28 and the cover 31 are formed as counterparts to the accommodation means 36 and encircle the transmission 37 from above. The magnetic field detectors 29, 30 are Hall sensors in the exemplary embodiment. The magnetic field detectors 29, 30 come to lie opposite the permanent magnets of the gear wheels 40 and 38. In this case they stand perpendicular to the axis of rotation of the gear wheels 38, 39. The magnetic field detector 29 comes to lie on the axis of rotation of the gear wheel 39, whereas the magnetic field detector 30 sits perpendicular to the axis of rotation of the gear wheel 38.

In typical vehicle steering means, a range of five to seven complete revolutions of the steering shaft is uniquely detected. In order to also uniquely determine the absolute angle of rotation for more than one complete revolution of the steering shaft, two assemblies are used. The one assembly forms a revolution sensor and comprises the gear wheels 39, 40 and the magnetic field detector 29. A transmission ratio of rotor 15 to gear wheel 40 of 6:1 is selected for example. The other assembly is used for the fine determination of the angle of rotation (angle sensor) and essentially comprises the gear wheel 38 with its permanent magnet as well as the magnetic field detector 30. A value of 1:3 is selected for the transmission ratio of rotor 15 to gear wheel 38, for example. The angle of rotation of the steering shaft can then be calculated directly from the two gear wheel angles measured with the magnetic field detectors 29, 30 in a known manner by means of the Nonius principle. Suitable calculation methods for this are known from the prior art and disclosed for example in DE 195 06 938 A1 and DE 199 62 241 A1.

Alternatively, a "small Nonius" can also be selected for the transmission ratio in order to be able to determine the current steering angle. In this case the gear wheel 40 can be omitted and the two gear wheels 38, 39 can each be provided with a magnet. The gear wheels 38, 39 then comprise different numbers of teeth, so that for example the gear wheel 39 rotates once more often than the gear wheel 38 over the full steering angle range of 5 to 7 revolutions of the steering column. Thus the actual steering angle can also be derived.

A plug 41 can also be integrated within the cover 31, by means of which the components 27, 29, 30 can be electrically connected to an external controller. An electrical connection between the device 1 on the one hand and a controller on the other hand is thus provided by means of the plug 41.

If the flux conductors 32, 33 are attached to the cover 31 or the housing 12, then the flux conductors 32, 33 extend in the radial direction and thus parallel to the edge elements 18, 19. The two flux conductors 32, 33 are in this case disposed on mutually opposite axial sides of the circuit board 28, wherein at least one of the flux conductors 32, 33 also lies axially between the edge elements 18, 19. In this case the flux conductor 32 lies at a short distance from the edge element 18, whereas the second flux conductor 33 is disposed at a short distance from the edge element 19.

Figure 5:
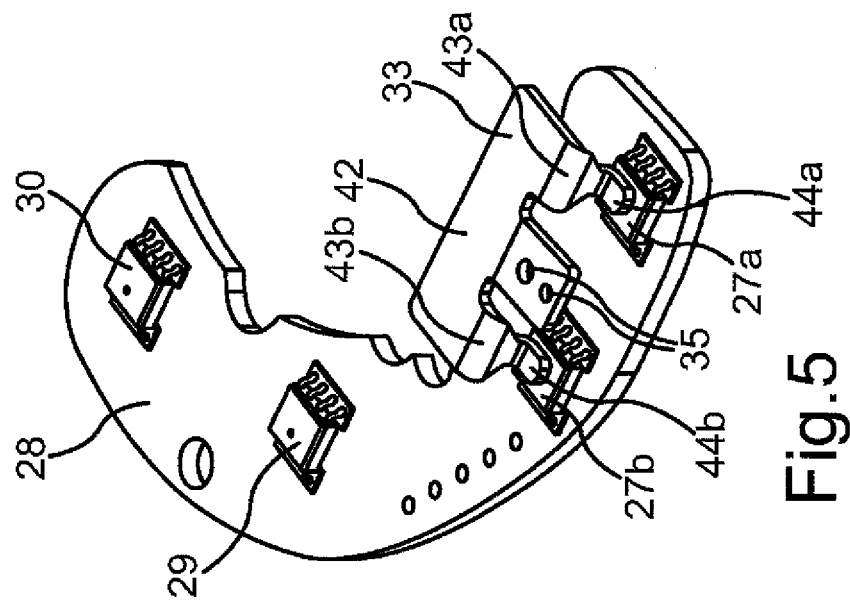
FIGS. 4 and 5 show different embodiments of a flux conductor.
Figure 4:
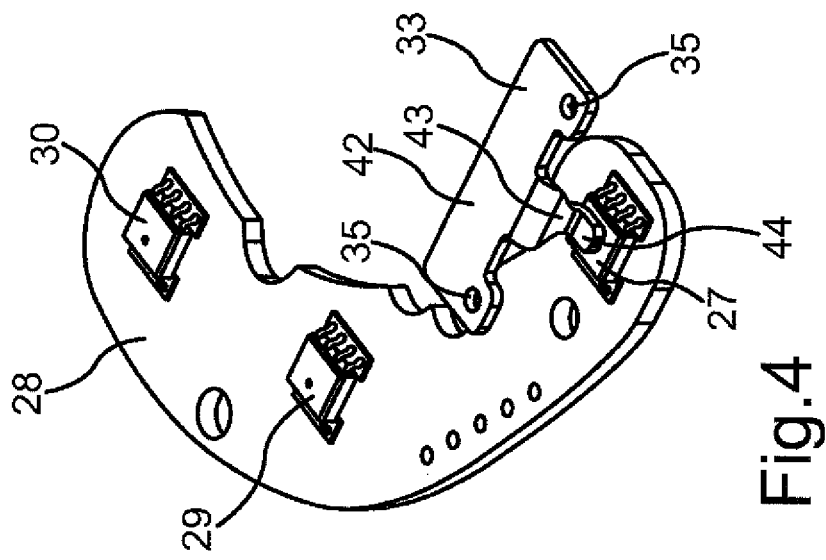

The configuration of the flux conductors 32, 33 is now explained in detail referring to FIGS. 4 and 5. The flux conductor 33 is illustrated in FIG. 4 according to one embodiment, wherein the flux conductor 32 is of correspondingly identical design. The flux conductor 33 has a plate-shaped and essentially rectangular receiving region 42, in which the through openings 35 are formed. A web 43 protrudes at a right angle from the receiving region 42 and a radial tab 44 protrudes in turn at a right angle from the web 43 and extends parallel to the receiving region 42. The tab 44 is significantly smaller than the receiving region 42 and is also of a plate-shaped form. It is disposed so as to be displaced in the axial direction relative to the receiving region 42. The tab 44 is in mutual axial overlap with the magnetic sensor 27 of the torque sensor device and at the same time is disposed at a very short axial distance from the magnetic sensor 27.

The first flux conductor 32 also has a corresponding tab 44 that extends axially into a cut-out formed in the circuit board 28 beneath the magnetic sensor 27 in order to ensure reliable transfer of the magnetic flux. The tab 44 of the first flux conductor 32 is thus also disposed in axial overlap with the magnetic sensor 27, so that the magnetic sensor 27 is disposed axially between the two tabs 44.

In the example according to FIG. 4, the single magnetic sensor 27 can be embodied as a single sensor or even as a dual sensor. In the case of a dual magnetic sensor, a total of two sensor elements, which are designed for separate detection of the magnetic flux and which provide sensor signals separately from each other, are integrated within a single SMD component.

In the exemplary embodiment according to FIG. 5, the flux conductor 33 comprises a total of two tabs 44a, 44b, which are connected by means of respective webs 43a, 43b to the receiving region 42. The through openings 35 are now formed between the webs 43a, 43b. The two tabs 44a, 44b lie in a common plane in this case and extend parallel to the receiving region 42. Each tab 44a, 44b is disposed so as to axially overlap a separate magnetic sensor 27a, 27b, both of which are mounted on the circuit board 28 as SMD components. The magnetic sensors 27a, 27b can be single sensors or dual sensors.

In the exemplary embodiment according to FIG. 5, the first flux conductor 32 also accordingly comprises two separate tabs, which are disposed so as to axially overlap the respective magnetic sensors 27a, 27b and in this case lie in respective cut-outs in the circuit board 28 for example.

Two further examples of flux conductors 33 are illustrated in FIGS. 13a to 13d. The flux conductor 33 according to FIGS. 13a and 13b also has a tab 44, which however is essentially axially oriented and points in the axial direction. Said tab 44 is designed such that a slot 142 that divides the receiving region 42 into two parts 42a, 42b is formed approximately in the centre of the receiving region 42. An axial protrusion 144, 145 protrudes perpendicularly from each part 42a, 42b in this case, wherein the protrusions 144, 145 are merged together at their ends and thus together form the axial tab 44. The tip of said tab 44 then axially overlaps the magnetic sensor 27.

A further example is shown in FIGS. 13c and 13d. Said flux conductor 33 corresponds essentially to the one according to FIG. 4, wherein the tab 44 now extends in the tangential direction. It is connected to the receiving region 42 by means of the web 43. Thus only the orientation of the web 43 and hence of the tab 44 differs from the embodiment according to FIG. 4.

Figure 3:
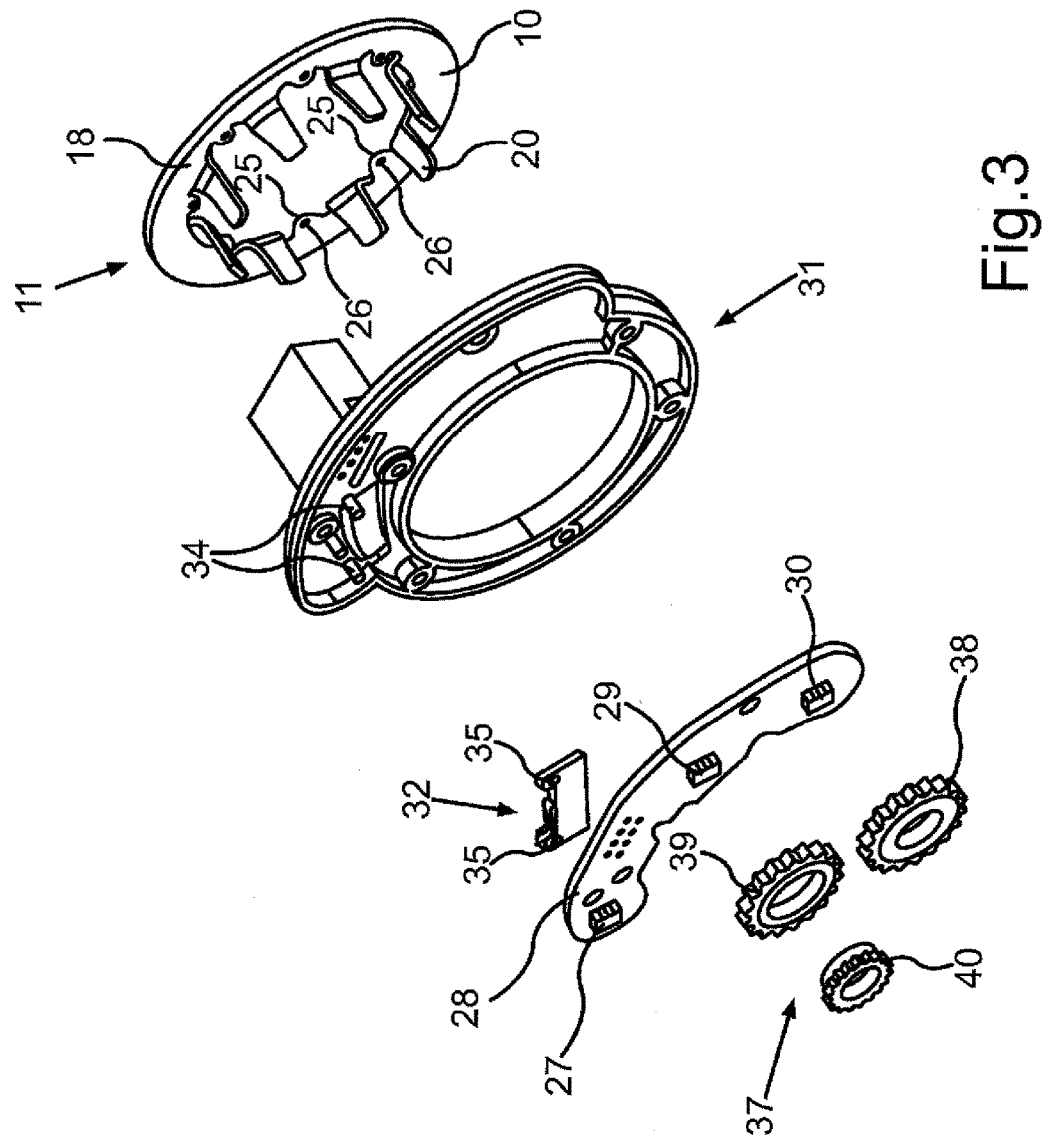
FIG. 3 shows a further region of the device according to FIG. 1 in an enlarged illustration.

Referring again to FIGS. 1 to 3, the housing 12 comprises pins or journals 45 that are or can be accommodated in corresponding through openings 46 of the cover 31. The attachment of the cover 31 to the housing 12 is then carried out by reshaping the pins 45 to form rivet heads.

Figure 6:
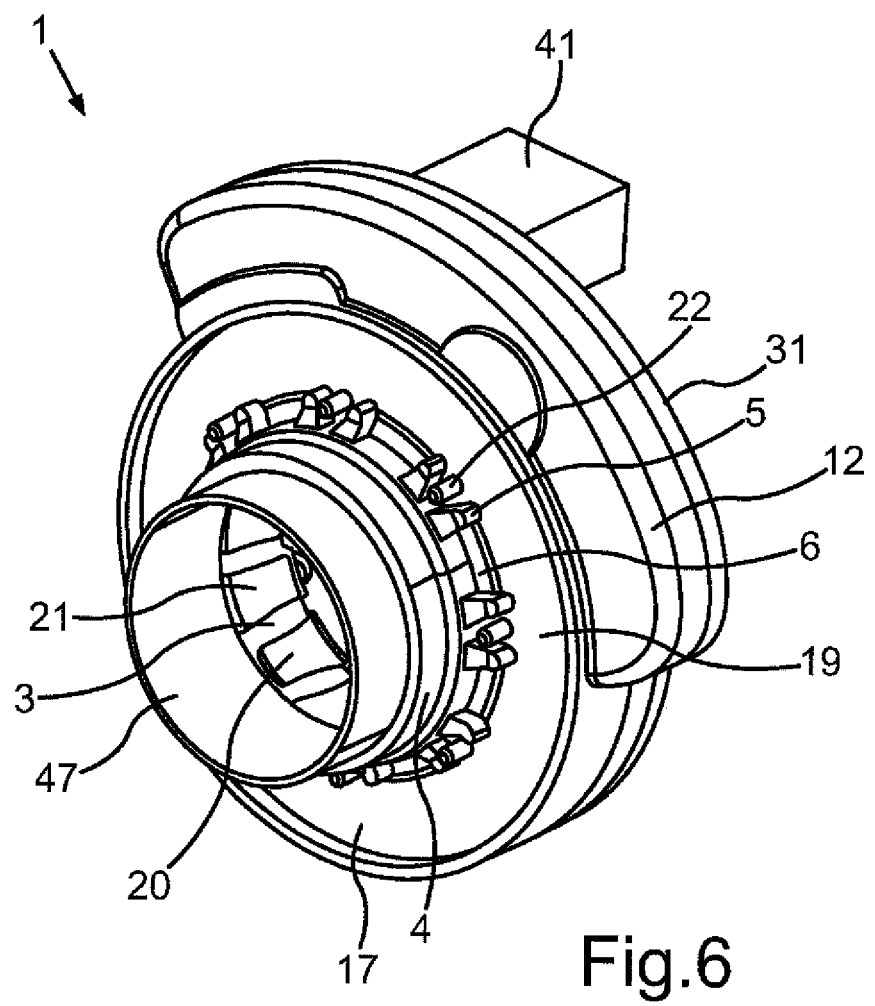
FIG. 6 shows the device according to FIG. 1 in the assembled state in a schematic and perspective illustration.
Figure 14:
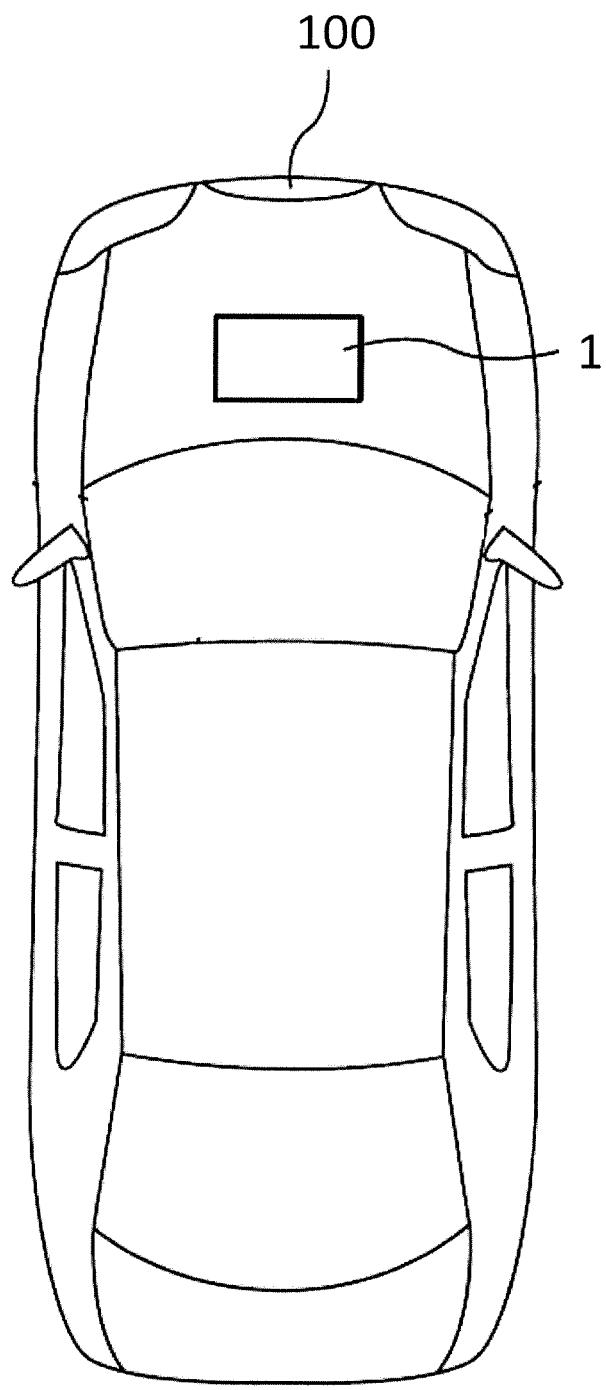
Figure 15:
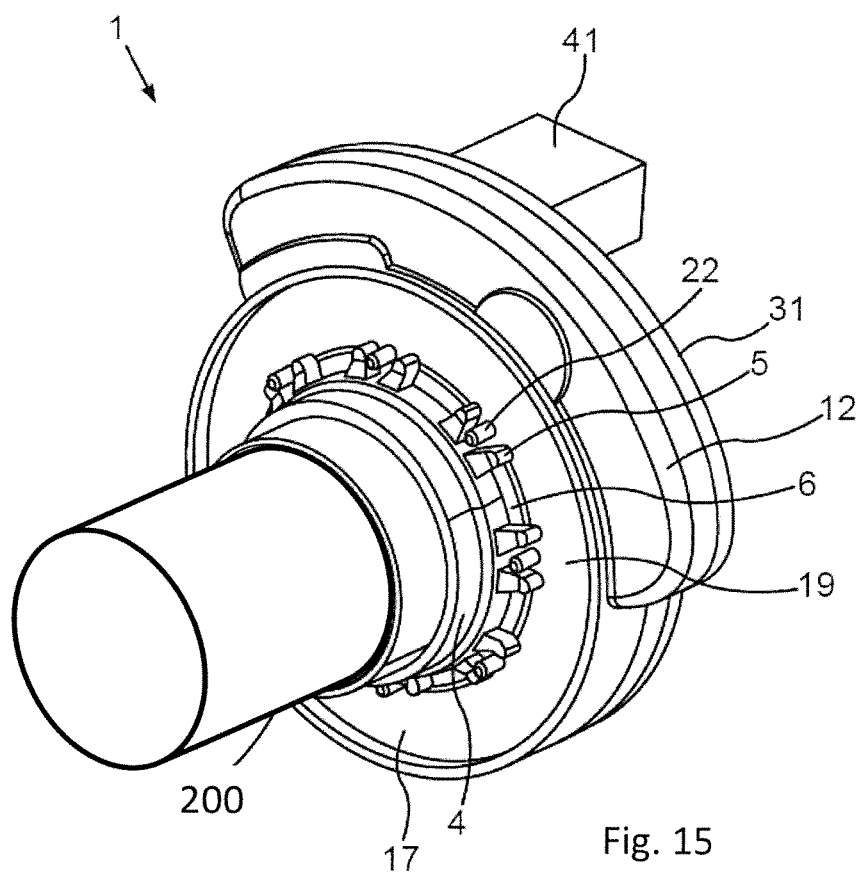

The device 1 is shown in the assembled state in FIG. 6. This shows the second axial region 4 of the holder 2, which protrudes axially out of the housing 12. The sleeve 47, by means of which the holder 2 is connected to the associated shaft segment, is immediately adjacent to said region 4 in the axial direction. Moreover, the stator part 17 with its edge element 19, which is fixed to the holder 2 by means of the pins 22, is shown In FIG. 6. The flux conductors 32, 33 as well as the circuit board 28 with the components 27, 29, 30 and the transmission 37 are in the interior of the housing 12 and hence are not shown. The housing 12 together with the cover 31 is attached to a part of the vehicle and the device 1 is electrically connected by means of the plug 41. The housing 12 is thus fixed relative to the steering shaft. The holder 2 with the stator parts 10, 17 can in this case be rotated relative to the housing 12 and to the flux conductors 32, 33, i.e. together with the steering shaft. In FIG. 6, moreover, the respective tooth elements 20, 21 of the stator parts 10, 17 on both sides can be identified. Said tooth elements 20, 21 can for example be disposed in indentations that are formed on the inner periphery of the first axial region 3 of the holder 2.

The accommodation means 36 for the transmission 37 is formed at the same axial height as the sleeve 13 and is disposed so as to be radially displaced relative to the sleeve 13. In the assembled state the circuit board 28 is disposed axially between the respective edge elements 18, 19 of the stator parts 10, 17. Different embodiments can now be provided for the axial arrangement of the components 27, 29, 30:

According to a first version, the components 27, 29, 30 can be disposed centrally between the edge elements 18, 19 in the axial direction. Such an arrangement is shown in FIG. 7, which illustrates a partly sectional illustration through the circuit board 28 and the magnetic field detector 30. The two stator parts 10, 17 with the respective edge elements 17, 18 are illustrated in a perspective view. The tooth elements 20 engage between the tooth elements 21. A central plane extending exactly axially centrally between the edge elements 17, 18 is designated with 48, which constitutes a plane of symmetry of the stator 11. With said exemplary embodiment, the components 27, 29, 30 lie axial centrally in the plane of symmetry or central plane 48. Inevitably, the gear wheels 38, 39, 40 are thus displaced axially relative to the central plane 48 and hence are disposed asymmetrically. This is shown in FIG. 7 using the gear wheel 38 with its permanent magnet (49).

In the example according to FIG. 7, the two flux conductors 32, 33 are disposed mirror symmetrically relative to the central plane 48. The respective receiving regions 42 of the flux conductors 32, 33 can lie either axially within the stator 11 and hence axially between the edge elements 18, 19 or even axially outside the stator 11—depending on the length of the web 43. The permanent magnets 49 of the gear wheels 38, 40 can be surface magnetized such that the magnetic field is of the same magnitude at the axial height of the two edge elements 18, 19 and hence cancels out. Crosstalk between the two types of sensor is thus prevented. The gear wheels 38, 39, 40 can also be optionally mounted a little further out in the radial direction in order to further reduce crosstalk.

According to a second version, the components 27, 29, 30 can be disposed in the axial direction off-centre between the edge elements 18, 19, and the permanent magnets 49 of the gear wheels 38, 40 can lie axially centrally between the edge elements 38, 40. The axial distance between the permanent magnet and the edge element 38 then corresponds to the axial distance between the permanent magnet and the other edge element 40. Such an arrangement of the circuit board 28 and of the transmission 37 is illustrated in FIGS. 8 and 9. Whereas a sectional illustration through the circuit board 28 at the position of the magnetic detector 30 is shown in FIG. 8, FIG. 9 shows a sectional illustration through the circuit board 28 at the height of the magnetic sensor 27. The stator 11 is illustrated in a perspective view in each case. As is apparent from FIG. 8, the permanent magnet 49 lies exactly in the central plane 48. Even with a conventional and not especially surface magnetized magnet 49, there is thus essentially the same magnetic field at the respective edge elements 18, 19.

According to FIG. 9, the two flux conductors 32, 33 are disposed asymmetrically relative to the centre axis 48. The receiving region 42 of one of the flux conductors 32, 33 lies in this case axially outside the stator 11 or is axially displaced relative to the stator 11, whereas the receiving region 42 of the other flux conductor 32, 33 lies axially within the stator 11. In FIG. 9, moreover, the through cut-out 50 in the circuit board 28 can be seen beneath the magnetic sensor 27. The tab 44 of the flux conductor 32, which is disposed on the rear side the circuit board 28, is disposed within said cut-out 50. The magnetic sensor 27 is thus enclosed very tightly by the tabs 44 of the flux conductor 32, 33 as in a sandwich construction or lies axially between the two tabs 44.

According to FIG. 10, a flex circuit board 28 is used, i.e. a circuit board 28 in the form of a thin film, whose thickness is preferably less than 0.2 mm. As is apparent from FIG. 10, a cut-out beneath the magnetic sensor 27 can be omitted, since the magnetic flux can be transmitted through the film. The two flux conductors 32, 33 are disposed mirror symmetrically relative to the central plane 48. The respective receiving regions 42 of the flux conductors 32, 33 are disposed axially within the stator 11 here and hence axially between the edge elements 18, 19, so that the two flux conductors 32, 33 lie fully axially between the edge elements 18, 19.

A further example is illustrated in FIG. 11. Said arrangement corresponds essentially to the one according to FIG. 9, but with the difference that the flux conductors 32, 33 are formed asymmetrically and both flux conductors 32, 33 are disposed axially within the stator 11 and hence axially between the edge elements 18, 19. This is made possible by the flux conductor 32 being formed with a shorter web 43 than the flux conductor 33. The axial installation height is thus further reduced.

Yet another example is illustrated in FIGS. 12a and 12b. In this case the circuit board 28 extends in the axial direction and is thus disposed parallel to the axial axis. Accordingly, the magnetic sensor 27 also extends along the axial direction, so that there is a mutual overlap between the magnetic sensor 27 and the tabs 44 in the radial direction. For this purpose the tabs 44 now extend in the axial direction and hence parallel to the circuit board 28. They can for example protrude directly from the respective receiving region 42 perpendicularly towards the respective other flux conductor 32, 33. Both flux conductors 32, 33 are disposed axially within the stator 11 and hence axially between the edge elements 18, 19, but are of an asymmetrical form. Here too a cut-out 50 is provided in the circuit board 28 that now extends as far as the edge of the circuit board 28 and hence forms an indentation. In this case the receiving region 42 of the flux conductor 32 extends axially into said indentation in order to be able to dispose the tab 44 of said flux conductor 32 on the rear side of the magnetic sensor 27. The example according to FIGS. 12a and 12b proves advantageous in particular for a pure torque sensor if a steering angle sensor device is omitted. An axial arrangement of the circuit board can then be advantageous with geometry restrictions of the steering housing. Thus two differently shaped flux conductors 32, 33 are used here in order to reach the magnetic field sensor 27 both from the radially outer side as well as from the radially inner side. Here too a thin flex circuit board can be used instead of a standard circuit board 28 with a cut-out 50.

With all versions, a metallic screening means 51, in particular a plate type screening means, can also be optionally provided axially between the permanent magnet 49 of the gear wheels 38, 40 on the one hand and at least one of the edge elements 18, 19 on the other hand. In FIGS. 7 and 8 such a screening means 51 is disposed on the rear side of the circuit board 28 and extends parallel to the central plane 48. A screening means 51 can, however, also be provided on the other side of the circuit board 28 in addition or as an alternative. The screening means 51 may also be formed as a metallization of the circuit board 28 directly on its rear side or front side. Respective screening plates can, for example, be provided on both axial sides of the gear wheels 38, 39, 40, which prevent crosstalk between the two types of sensor by means of the stator 11. The permanent magnets 49 can be magnetized diametrically in this case.

The invention claimed is:
1. A device for a motor vehicle, comprising:
   a torque sensor device for detecting a torque applied to a steering shaft of the motor vehicle; and
   a steering angle sensor device for detecting a current steering angle of the steering shaft,
   wherein the torque sensor device comprises a magnetic stator for conducting magnetic flux from a magnet to at least one flux conductor and through the same to at least one magnetic sensor of the torque sensor device and two stator parts that are disposed so as to be displaced relative to each other in an axial direction, each of which comprises an annular edge element extending in a radial direction,
   wherein the steering angle sensor device comprises at least one rotation transmission element with a permanent magnet and a magnetic field detector for detecting a rotary motion of the rotation transmission element, and wherein
   the at least one rotation transmission element with the permanent magnet is disposed between the edge elements in the axial direction.

2. The device according to claim 1, wherein at least one rotation transmission element with its permanent magnet is disposed so as to be at least partially in mutual axial overlap with the edge elements.

3. The device according to claim 1, wherein at least one rotation transmission element with its permanent magnet is disposed so as to be displaced in the radial direction relative to the edge elements.

4. The device according to claim 1, wherein the magnetic field detector is disposed on a circuit board that is disposed axially between the edge elements.

5. The device according to claim 1, wherein the permanent magnet is disposed in the axial direction off-centre between the edge elements of the stator parts, and is designed to provide a magnetic field with the same field strength at the respective edge elements of the stator parts.

6. The device according to claim 1, wherein the permanent magnet is disposed centrally between the edge elements of the stator parts in the axial direction, and the at least one magnetic sensor is disposed axially off-centre between the edge elements.

7. The device according to claim 1, wherein a screening means for magnetic fields is disposed axially between the permanent magnet on the one hand and at least one of the edge elements on the other hand.

8. The device according to claim 1, wherein the steering angle sensor device comprises a rotor with a tooth structure and the rotation transmission element is in the form of a gear wheel, which can be brought into engagement with the tooth structure of the rotor and by means of which a rotary motion of the rotor can be transferred into a rotary motion of the permanent magnet, wherein the rotor with its tooth structure is moulded onto a holder on which the stator is disposed.

9. The device according to claim 1, wherein the at least one magnetic sensor is in the form of an SMD component that is disposed on a common circuit board for the torque sensor device and the steering angle sensor device, wherein the at least one flux conductor comprises a tab that is disposed so as to be in mutual overlap with the magnetic sensor.

10. The device according to claim 9, wherein the tab is disposed so as to be in mutual axial overlap with the magnetic sensor.

11. The device according to claim 9, wherein the at least one flux conductor comprises a plate-shaped receiving region for receiving the magnetic flux from the stator, said region being disposed so as to be in mutual axial overlap with the stator, and the tab extending parallel to the receiving region is disposed so as to be displaced in the axial direction relative to the receiving region.

12. The device according to claim 9, further comprising two flux conductors, each with at least one tab, which are disposed on mutually opposite sides of the circuit board, wherein the respective tabs are disposed so as to be in mutual overlap with the magnetic sensor in the axial direction.

13. The device according to claim 12, wherein the circuit board comprises a cut-out for the tab of one of the flux conductors, the cut-out being formed beneath the magnetic sensor.

14. The device according to claim 12, wherein the circuit board is in the form of a film at least in the region of the magnetic sensor.

15. A motor vehicle comprising the device of claim 1.

16. A method for operating a device with a torque sensor device for detecting a torque applied to a steering shaft of a motor vehicle and with a steering angle sensor device for detecting a current steering angle of the steering shaft, wherein a magnetic sensor, a flux conductor and a magnetic stator are provided for the torque sensor device, the method comprising:
conducting, by the magnetic stator, magnetic flux from a magnet to the flux conductor and through the same to the magnetic sensor, wherein the magnetic stator is formed of two stator parts that are disposed so as to be displaced relative to each other in the axial direction, each of which comprises an annular edge element extending in the radial direction and detecting a rotary motion of at least one rotation transmission element with a permanent magnet and a magnetic field detector for the steering angle sensor device, wherein
the at least one rotation transmission element with the permanent magnet are disposed between the edge elements in the axial direction.

\* \* \* \* \*